United States Patent
Stephen et al.

(10) Patent No.: US 10,380,096 B2
(45) Date of Patent: Aug. 13, 2019

(54) DATA MIGRATION

(71) Applicant: NCR Corporation, Duluth, GA (US)

(72) Inventors: Gregor Leonard Stephen, Dundee (GB); Stuart Birse, Linlithgow (GB)

(73) Assignee: NCR Corporation, Atlanta, GA (US)

(*) Notice: Subject to any disclaimer, the term of this patent is extended or adjusted under 35 U.S.C. 154(b) by 443 days.

(21) Appl. No.: 15/364,676

(22) Filed: Nov. 30, 2016

(65) Prior Publication Data
US 2018/0150497 A1    May 31, 2018

(51) Int. Cl.
| | |
|---|---|
| *G06F 16/00* | (2019.01) |
| *G06F 16/23* | (2019.01) |
| *G06F 16/25* | (2019.01) |
| *G06F 8/65* | (2018.01) |
| *G06F 16/11* | (2019.01) |
| *G06F 16/21* | (2019.01) |

(52) U.S. Cl.
CPC ............ *G06F 16/2329* (2019.01); *G06F 8/65* (2013.01); *G06F 16/119* (2019.01); *G06F 16/214* (2019.01); *G06F 16/254* (2019.01); *G06F 16/258* (2019.01)

(58) Field of Classification Search
CPC .. G06F 16/119; G06F 16/2329; G06F 16/214; G06F 16/258; G06F 16/254
See application file for complete search history.

(56) References Cited

U.S. PATENT DOCUMENTS

| | | | | |
|---|---|---|---|---|
| 5,437,025 A | * | 7/1995 | Bale | G06F 9/449 |
| 2009/0007147 A1 | * | 1/2009 | Craft | G06F 9/455 |
| | | | | 719/320 |
| 2013/0298107 A1 | * | 11/2013 | Li | G06F 8/24 |
| | | | | 717/115 |
| 2018/0293233 A1 | * | 10/2018 | Higginson | G06F 16/214 |

OTHER PUBLICATIONS

Milos Gligoric, Wolfram Schulte, Chandra Prasad, Danny van Velzen, Iman Narasamdya, and Benjamin Livshits, "Automated Migration of Build Scripts using Dynamic Analysis and Search-Based Refactoring", ACM, OOPSLA Oct. 20-24, pp. 599-616. (Year: 2014).*

(Continued)

*Primary Examiner* — Cheryl Lewis
(74) *Attorney, Agent, or Firm* — Schwegman, Lundberg & Woessner

(57) ABSTRACT

Various embodiments herein each include at least one of systems, methods, and software for data migration, such as when migrating a database from one form to a next and as may be performed at a time of software system version migration. One example embodiment, in the form of a method, includes loading a database migration script that includes a prior class from a software system prior to an upgrade of the software system and a new class from the software system after the upgrade to the software system. The method proceeds by then calling methods of the prior class to copy database data from database tables impacted by the database migration script to a memory device and executing the database migration script. The method then calls methods of the new class to copy the database data from the memory device back to the database.

20 Claims, 5 Drawing Sheets

(56) References Cited

OTHER PUBLICATIONS

Sam Tobin-Hochstadt and Matthias Felleisen, "Interlanguage Migration: From Scripts to Programs", OOPSLA'06, ACM, Oct. 22-26, pp. 964-974. (Year: 2006).*
Marcin Grzejsczak: "Zero Downtime Deployment with a Database", May 31, 2016 (May 31, 2016), XP055445337, Retrieved from the Internet: URL:https://spring.io/blog/2016/05/31/zero-downtime-deployment-with-a-database [retrieved on Jan. 26, 2018] * the whole document *.
D1: Barbara Staudt Lerner: "A model for compound type changes encountered in schema evolution", ACM Transactions on Database Systems, ACM, New York, NY, US, vol. 25, No. 1, Mar. 1, 2000 (Mar. 1, 2000), pages 83-127, XP058094809, ISSN: 0362-5915, DOI: 10,1145/352958.352983.
D2: Barbara Staudt Lerner: "A model for compound type changes encountered in schema evolution", Mar. 1, 2000 (Mar. 1, 2000), ACM Transactions on Database Systems, ACM, New York, NY, US, pp. 83-127, XP058094809, ISSN: 0362-5915.
Michael Wenz: "Using Liquidbase for Database Migrations in SAP Netweaver Cloud", Sep. 5, 2012 (Sep. 5, 2012), XP055445331, Retrieved from the Internet: URL:http://blogs.sap.com/2012/09/05/using-liquidbase-for-database-migrations-in-sap-netweaver-cloud/ [retrieved on Jan. 26, 2018].

* cited by examiner

DATA MIGRATION

BACKGROUND INFORMATION

When upgrading a deployed software system in a customer environment to a new version complex data migrations are common and should be supported for existing customer data. These migrations can become very complex if the underlying schema of the database changes as part of the upgrade to the new software version. Third-party database versioning tools such as Liquibase (which may also be referred to as database migration or database refactoring tools) already have the ability to call scripting and executable code, such as Java code, to manipulate data. However, such solutions require that custom code be written for each migration and this custom code often duplicates existing business logic. Implementation of such tools can therefore be technically complex, time consuming, and involve risk.

SUMMARY

Various embodiments herein each include at least one of systems, methods, and software for data migration, such as when migrating a database from one form to a next and as may be performed at a time of software system version migration.

One example embodiment, in the form of a method, includes loading a database migration script that includes a prior class from a software system prior to an upgrade of the software system and a new class from the software system after the upgrade to the software system. The method proceeds by then calling methods of the prior class to copy database data from database tables impacted by the database migration script to a memory device and executing the database migration script. The method then calls methods of the new class to copy the database data from the memory device back to the database.

Another method embodiment includes copying data from a database to a memory device according to a first version of a class and executing a database change script that changes a database table from which the data was copied. The method may then copy data back to the database from the memory device according to a second version of the class.

A further embodiment is in the form of a system. A system of such embodiments includes a processor, a memory device, an ancillary memory device, and instructions stored on the at least one memory device that are executable by the processor to perform data processing activities. The data processing activities of some such embodiments includes copying data from a database to the ancillary memory device according to a first version of a class and executing a database change script that changes a database table from which the data was copied. The data processing activities may then copy data back to the database from the ancillary memory device according to a second version of the class.

DETAILED DESCRIPTION

Figure 1:
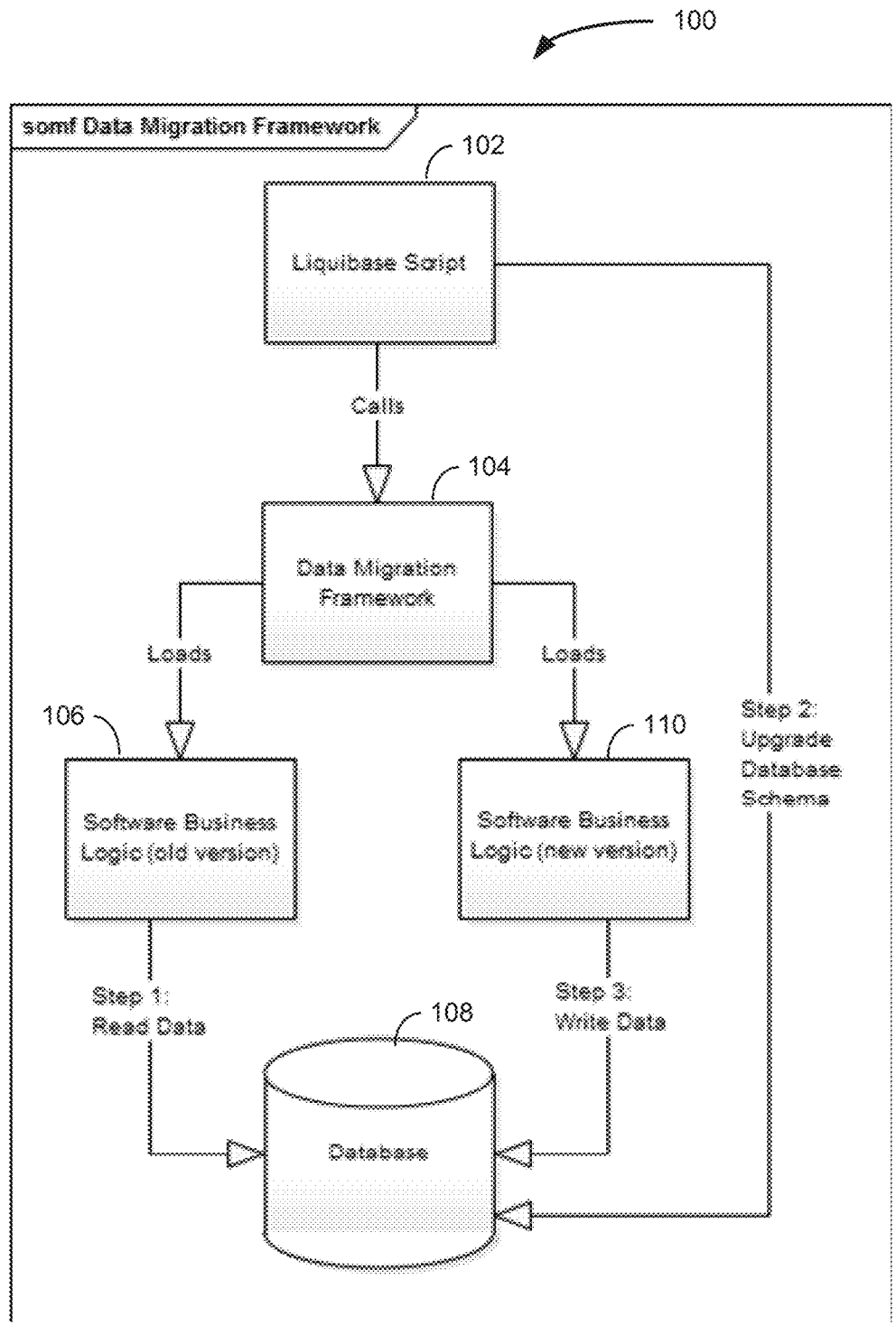
FIG. 1 is a block flow diagram of a method, according to an example embodiment.

Various embodiments herein each include at least one of systems, methods, and software for data migration, such as when migrating a database from one form to a next and as may be performed at a time of software system version migration.

These embodiments are based on a general data migration framework which uses the existing old and new versions of production software to perform the data migration when performing a software system upgrade. This data migration framework includes three steps, but may include more in some embodiments. These Three steps are:
1. Read the data from the database using the old version of the production software;
2. Perform the database schema changes required for the upgrade; and
3. Save the data back to the database using the new version of the production software.

Systems downgrades can also be performed following the same pattern, except the steps are performed in the reverse order.

Some of embodiments based on this data migration framework use complex Java class loading which allows two versions of the production software to run side by side, share data, and be coordinated as part of an upgrade/downgrade task, as Java and tools such as Liquibase may not allow two versions of the same class in a single class loader.

The Data Migration Framework and architecture, in some embodiments, is capable of creating an in-memory application representing specific versions of production software that is provided to the Java class. In terms of the three steps, this may include:
Step 1: The old version of the production software and the application that is created to read the data from the database using the existing schema. This data can then be manipulated in Java code before being stored in shared memory. Examples of manipulations currently performed using the Framework include consolidation, serialization, encryption.
Step 2: The database schema is then upgraded.
Step 3: The stored data is then retrieved from the shared memory where the data can be manipulated further then persisted back into the database using an in-memory application representing the new version of the production software.

By creating separate in-memory applications representing the "old" and "new" versions of the production software, such embodiments can load in two versions of the same classes during the data migration. This allows use of existing business or other application logic to perform complex data migrations without having to write database-specific SQL queries or duplication of application/class logic.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, AMC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block flow diagram of a method 100, according to an example embodiment. The method 100 is an example method built upon the three steps discussed above. The method 100, as illustrated in FIG. 1, is illustrated with reference to Liquibase and a Liquibase script. Liquibase is a platform independent, open source database migration or database refactoring tool. Scripts execute within Liquibase to make calls to databases to perform functions to copy, manipulate, and transform data, which may also include execution of computer code, such as Java code, to perform various data processing tasks.

Thus, the method 100 includes execution of a Liquibase script 102 within a Liquibase computing environment on a computer. The Liquibase script 102 may be executed to make changes to a database 108 local to the computer on which the Liquibase script 102 executes or as may be accessed elsewhere, such as across a network. The Liquibase script 102 may implement the data migration framework 104 discussed above by following step 1 to read and copy data from the database 108 with a copy of an old class 106 including logic from an old version of an application tailored to execute against an old database 108 data model or schema. The data is copied using the old class 106 that is copied from the old version of the application and the data is stored to a memory device. The memory device to which the data copied from the database is stored may be location to the computer performing the method 100 or may be remote, such as may be accessed via a network. Further, the data copied from the database may copied to a detachable data storage device, such as an external hard drive.

The method 100 then performs step 2 executes the Liquibase script 102 portions for making changes to the database 108 and then continues with step three to copy the data back into the database using a new class 110 that is tailored to execute against the new data model or schema of the database 108.

Prior to starting the method 100, the Liquibase script 102 may include a step to stop an application and to lock the database 108 to prevent data changes that may corrupt data or application states.

Figure 2:
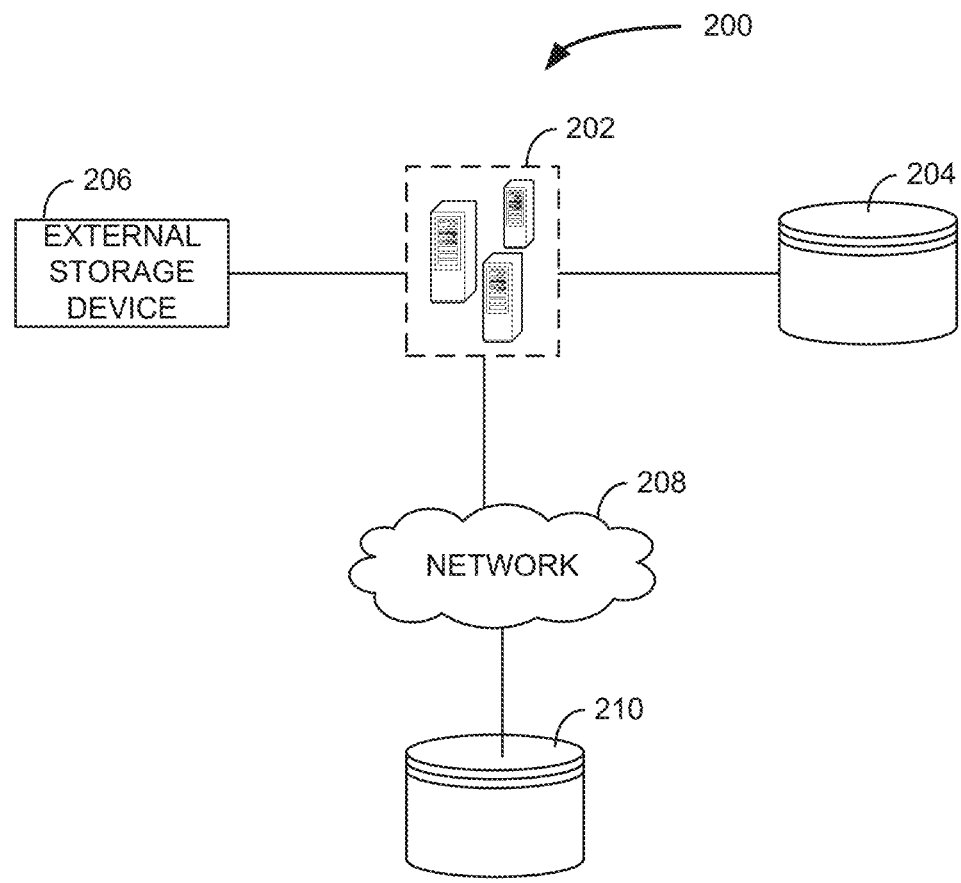
FIG. 2 is an architectural diagram of a system, according to an example embodiment.

FIG. 2 is an architectural diagram of a system 200, according to an example embodiment. The system 200 is an example of a system on which the method 100 may be implemented. Not all elements of the system 200 need be present in all embodiments and additional elements may be present in other embodiments.

The system 200 includes a computer 202 on which a data migration plan is executed, such as may be included in a Liquibase script 102 of FIG. 1. The computer 202 may include a Liquibase or other similar software tool thereon. The computer 202 may include a database 204 thereon or otherwise coupled thereto via a network 208, such as to database 210, or other connection. One or more external data storage devices 206 may be coupled to the computer 202.

Figure 3:
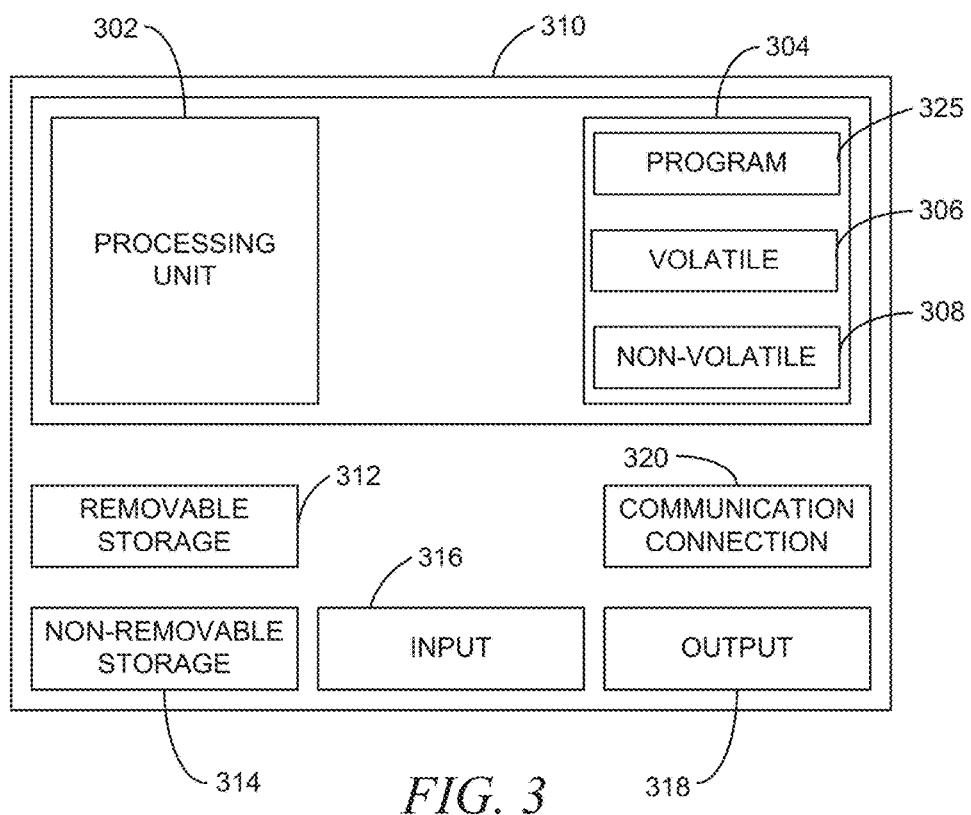
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 325 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 310 to provide generic access controls in a COM based computer network system having multiple users and servers.

Figure 4:
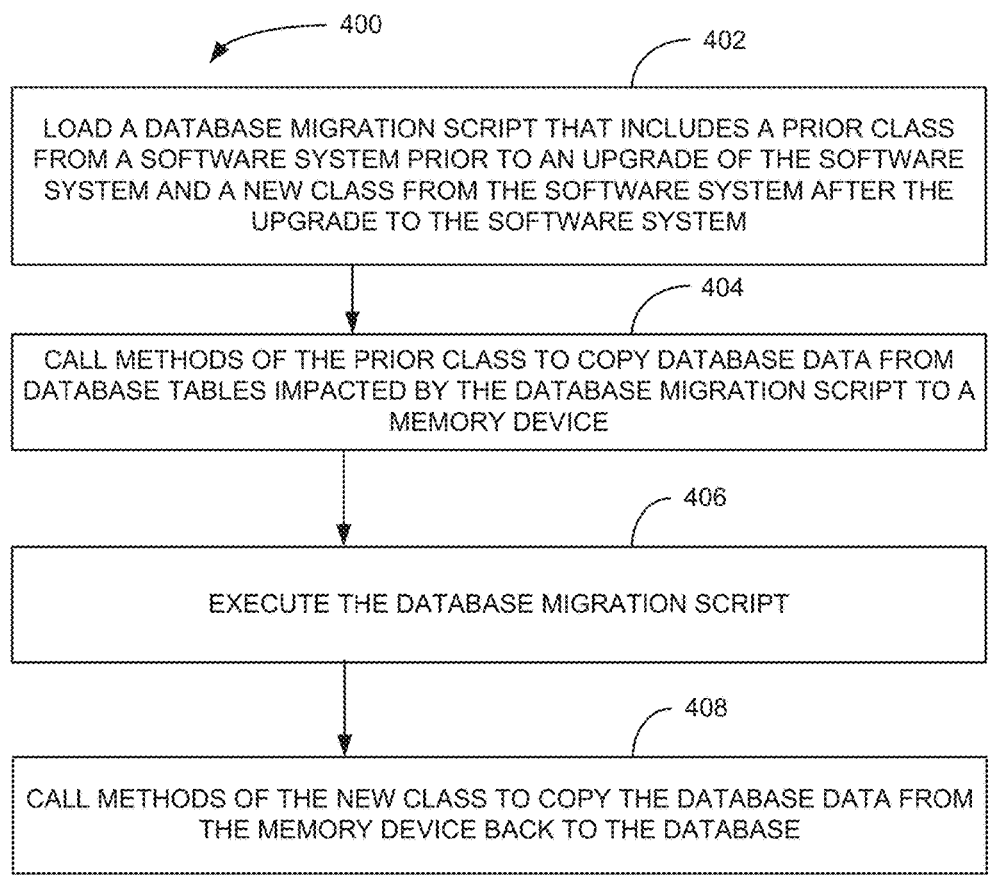
FIG. 4 is a block flow diagram of a method, according to an example embodiment.

FIG. 4 is a block flow diagram of a method 400, according to an example embodiment. The method 400 is an example of a method that may be performed on a computer, such as the computer 202 of FIG. 2, to perform a data migration.

The method 400 includes loading 402 a database migration script that includes a prior class from a software system prior to an upgrade of the software system and a new class from the software system after the upgrade to the software system. The method 400 may then call 404 methods of the prior class to copy database data from database tables impacted by the database migration script to a memory device. The method 400 then continues by executing 406 the database migration script and then calling 408 methods of the new class to copy the database data from the memory device back to the database.

In some embodiments of the method 400, the prior class is loaded 402 into memory for execution of the methods thereof prior to the methods being called and the prior class is then unloaded after copying of the database data to the memory device. Similarly in some such embodiments, the new class is loaded into memory for execution of the methods thereof subsequent to the executing 406 of the database migration script and prior to the methods being called.

In some embodiments of the method 400, the database migration script, the prior class, and the new class are bundled as a database migration plan that is executable by a database migration tool, such as Liquibase as discussed above. In some such embodiments, the database migration tool provides a computing environment within which the prior class and the new class are executable. The database migration tool may include a version for each of a plurality of computing platforms or computing platform variables, such as different database management systems, each of which is able to execute the same database migration plan.

Some embodiments of the method 400 further include stopping execution of the software system prior to execution of the database migration plan, issuing a database migration tool command to begin execution of the database migration plan, and restarting execution of the software system. In some such embodiments, the method 400 may also modify the software system that executes against data stored in the database.

Figure 5:
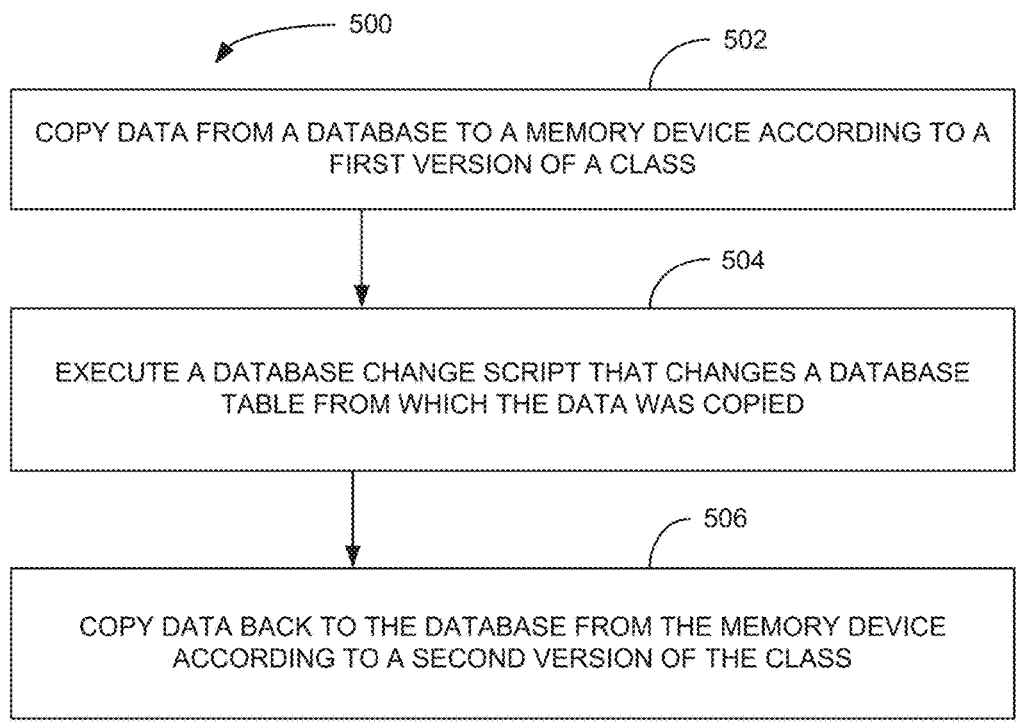
FIG. 5 is a block flow diagram of a method, according to an example embodiment.

FIG. 5 is a block flow diagram of a method 500, according to an example embodiment. The method 500 is another example of a method that may be performed on a computer, such as the computer 202 of FIG. 2, to perform a data migration.

The method 500 includes copying 502 data from a database to a memory device according to a first version of a class and executing 504 a database change script that changes a database table from which the data was copied. The method 500 may then copy 506 data back to the database from the memory device according to a second version of the class.

In some such embodiments of the method 500, the first and second versions of the class are classes of a software application that executes against the data copied from and to the database. The first version of the class may be tailored to the database prior to changes being made to the database table through the execution of the database change script, while the second version of the class may be tailored to the database after changes are made to the database table through the execution of the database change script. Further in some embodiments, the first version of the class may be loaded into memory for execution of the methods thereof prior to the methods being called and the first class is then unloaded after copying of the database data to the memory device. Similarly, the second version of the class may be loaded into memory for execution of the methods thereof subsequent to the executing of the database change script and prior to the methods of the second version of the class being called.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   loading a database migration script that includes a prior class from a software system prior to an upgrade of the software system and a new class from the software system after the upgrade to the software system;
   calling methods of the prior class to copy database data from database tables impacted by the database migration script to a memory device wherein the called methods of the prior class perform at least one of copying, manipulating, and transforming the data;
   executing the database migration script; and
   calling methods of the new class to copy the database data from the memory device back to the database wherein the called methods of the new class perform at least one of copying, manipulating, and transforming the data.

2. The method of claim 1, wherein:
   the prior class is loaded into memory for execution of the methods thereof prior to the methods being called and the prior class is then unloaded after copying of the database data to the memory device; and
   the new class is loaded into memory for execution of the methods thereof subsequent to the executing of the database migration script and prior to the methods being called.

3. The method of claim 1, wherein the database migration script, the prior class, and the new class are bundled as a database migration plan that is executable by a database migration tool.

4. The method of claim 3, wherein the database migration tool provides a computing environment within which the prior class and the new class are executable.

5. The method of claim 4, wherein a database migration tool s available for each of a plurality of computing platforms, each of which is able to execute the same database migration plan.

6. The method of claim 4, further comprising:
   stopping execution of the software system prior to execution of the database migration plan;
   issuing a database migration tool command to begin execution of the database migration plan; and
   restarting execution of the software system.

7. The method of claim 6, further comprising:
   modifying the software system that executes against data stored in the database.

8. The method of claim 6, further comprising:
   modifying the software system that executes against data stored in the database.

9. A method comprising:
   copying data from a database to a memory device by calling a method of a first, prior version of a class of a prior version of a software application, wherein the called method of the first, prior class perform at least one of copying, manipulating, and transforming the data;

executing a database change script that changes a database table from which the data was copied, the database table changes made from a form of the database table as utilized by the prior version of the application to a new version of the software application; and copying data back to the database from the memory device by calling a method of a second, new version of the class of the new version of the software application, wherein the called method of the second, new class perform at least one of copying, manipulating, and transforming the data.

10. The method of claim 9, wherein:

the first, prior and second, new versions of the class are classes of the software application that executes against the data copied from and to the database;

the first, prior version of the class is tailored to the database prior to changes being made to the database table through the execution of the database change script; and the second, new version of the class is tailored to the database after changes are made to the database table through the execution of the database change script.

11. The method of claim 10, wherein:

the first, prior version of the class is loaded into memory for execution of the methods thereof prior to the methods being called and the first class is then unloaded after copying of the database data to the memory device; and the second, new version of the class is loaded into memory for execution of the methods thereof subsequent to the executing of the database change script and prior to the methods of the second, new version of the class being called.

12. The method of claim 9, wherein the database change script, the first, prior version of the class, and the second, new version of the class are bundled as a database change plan that is executable by a database change tool.

13. The method of claim 12, wherein the database change tool provides a computing environment within which the first, prior version of the class and the second, new version of the class are executable.

14. The method of claim 13, wherein a database change tool is available for each of a plurality of computing platforms, each of which is able to execute the same database change plan.

15. The method of claim 13, further comprising:

stopping execution of the software system prior to execution of the database change plan;

issuing a database change tool command to begin execution of the database change plan; and restarting execution of the software system.

16. A system comprising:

a processor, a memory device, an ancillary memory device, and instructions stored on the at least one memory device that are executable by the processor to perform data processing activities, the data processing activities comprising:

copying data from a database to the ancillary memory device by calling a method of a first, prior version of a class of a prior version of a software application, wherein the called method of the first, prior class perform at least one of copying, manipulating, and transforming the data;

executing a database change script that changes a database table from which the data was copied, the database table changes made from a form of the database table as utilized by the prior version of the application to a new version of the software application; and copying data back to the database from the ancillary memory device by calling a method of a second version of the class of the new version of the software application, wherein the called method of the second, new class perform at least one of copying, manipulating, and transforming the data.

17. The system of claim 16, wherein the ancillary memory device is a data storage device of the system.

18. The system of claim 16 wherein:

the first, prior and second, new versions of the class are classes of the software application that executes against the data copied from and to the database;

the first, prior version of the class is tailored to the database prior to changes being made to the database table through the execution of the database change script; and the second, new version of the class is tailored to the database after changes are made to the database table through the execution of the database change script.

19. The system of claim 18, wherein:

the first, prior version of the class is loaded into memory for execution of the methods thereof prior to the methods being called and the first class is then unloaded after copying of the database data to the memory device; and the second, new version of the class is loaded into memory for execution of the methods thereof subsequent to the executing of the database change script and prior to the methods of the second version of the class being called.

20. The system of claim 16, wherein:

the database change script, the first, prior version of the class, and the second, new version of the class are bundled as a database change plan that is executable by a database change tool; and the database change tool provides a computing environment within which the first, prior version of the class and the second, new version of the class are executable.

* * * * *